Patented Oct. 6, 1953

2,654,760

UNITED STATES PATENT OFFICE 2,654,760

PREPARATION OF 4-METHYL-5-($\beta$-HYDROXYETHYL)-THIAZOLE

Thomas E. Londergan, Niagara Falls, and William R. Schmitz, Grand Island, N. Y., assignors to E. I. du Pont de Nemours & Company, Wilmington, Del., a corporation of Delaware No Drawing. Application February 20, 1952,
Serial No. 272,694

11 Claims. (Cl. 260—302)

This invention relates to the preparation of 4-methyl-5-($\beta$-hydroxyethyl)-thiazole by the reaction of 2,3-dichlorotetrahydro-2-methylfuran, or the corresponding dibromo compound, with thioformamide, as illustrated by the following equation in which use of the dichloro compound is shown:

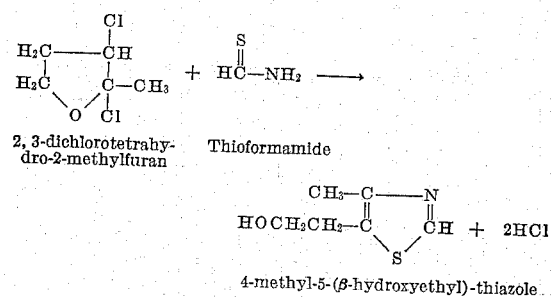

2,3-dichlorotetrahydro-2-methylfuran    Thioformamide 4-methyl-5-($\beta$-hydroxyethyl)-thiazole The above thiazole compound is an important intermediate for the production of vitamin $B_1$. It has been prepared previously by the reaction of thioformamide: with 3-halo-3-acetopropanol (U. S. P. 2,133,969); with esters of 3-halo-3-acetopropanol (U. S. P. 2,194,179); with 2-alkoxy-2-methyl-3-chlorotetrahydrofurans (German Patent 663,305); and with $\alpha$-halo-$\alpha$-aceto-$\gamma$-butyrolactone (German Patent 664,789). It has also been prepared by the reaction of 3-bromo-3-acetopropyl acetate with barium thiocyanate, followed by rearrangement (U. S. P. 2,139,570). Such prior methods are not entirely satisfactory in that they give the desired product in low yields or require reaction periods of several days.

It is an object of the invention to provide a new method for preparing 4-methyl-5-($\beta$-hydroxyethyl)-thiazole. A further object is to provide a method involving the reaction of 2,3-dichlorotetrahydro-2-methylfuran, or the corresponding dibromo compound, with thioformamide whereby good conversions to the above thiazole compound are realized in relatively short reaction periods. Still further objects will be apparent from the following description.

The above objects are accomplished in accordance with the invention by reacting 2,3-dichlorotetrahydro-2-methylfuran, or 2,3-dibromotetrahydro-2-methylfuran, with thioformamide. It has been discovered that the indicated reactions offer a practical way of preparing 4-methyl-5-($\beta$-hydroxyethyl)-thiazole; they can be carried out readily and with good conversions to the thiazole in relatively short reaction periods. Since the starting dichloro or dibromo compound can be readily obtained, e. g., by the method disclosed in the application of Hause, Serial No. 272,700, filed February 20, 1952, the present invention makes possible a commercially attractive route to the above thiazole compound.

In preparing 4-methyl-5-($\beta$-hydroxyethyl)-thiazole by the above reaction, the reactants may be brought together in any desired manner. Preferably, the reaction is carried out in a suitable solvent such as diethyl ether, tetrahydrofuran, ethanol, isopropyl alcohol, water, formic acid, acetic acid, and mixtures of water and ethanol and the like. The preferred solvent is formic acid containing 50–100%, most preferably 88–90%, HCOOH by weight, the balance being water. However, any other solvent material may be used which has an appreciable solvent power for both reactants, and preferably also for the thiazole product, and which is either completely unreactive towards or does not harmfully or irreversibly react with either of the reactants or the thiazole product. Such solvents are hereinafter referred to as "substantially inert solvents," which term is intended to include such useful solvents as formic acid which may react with the thiazole to give products which can be readily converted to the thiazole.

The solvent can be employed in the reaction medium in any desired amount although it is generally desirable to employ an amount equal to or greater than the weight of the dihalo compound being reacted. The most preferred weight ratios of solvent to the dihalo compound are in the range of about 1.5:1 to 4:1. Considerably larger amounts of solvent can be used if desired.

The fact that 50–100% formic acid is an excellent solvent is surprising because of the known ease with which thioamides are hydrolyzed by heating with aqueous acids or alkali, and by the known ease with which they are converted to nitriles by elimination of hydrogen sulfide. Thioformamide is generally considered to be substantially less stable than its higher homologs and it decomposes merely upon standing at room temperature for any considerable period of time. It was therefore not expected that acidic reaction media would be suitable for the present reaction.

The reaction may be carried out over a fairly wide temperature range. At a temperature of about 15° C. it proceeds but at a relatively slow rate and may require a reaction period of about 1 week for completion. Temperatures on the order of about 100° C. can be used, at which temperature the reaction proceeds rapidly and may require only 1 or 2 hours for completion. Considerable decomposition of the reactants may occur at such latter temperatures in view of which lower temperatures are generally desirable. The most suitable temperatures are in the range of about 35–80° C. At temperatures within this range the reaction proceeds readily with good conversions. Thus, at around 55–60° C. conversions on the order of 75% can be obtained in reaction times of about 20 hours.

Since hydrogen chloride or hydrogen bromide is a by-product of the reaction, it has been found highly desirable to carry out the reaction in the presence of an acid acceptor. Suitable acid acceptors are the alkali and alkaline earth metal hydroxides, carbonates, bicarbonates, formates and acetates, as well as basic amino compounds which exhibit the property of combining with the by-product hydrogen halide as the latter is evolved in the reaction. The choice of acid acceptor to be used will be determined considerably by the type of solvent employed. Thus, when employing an acidic solvent such as formic acid or acetic acid, basic materials such as the carbonates and bicarbonates would be unsuitable. However, with such acidic solvents other bases such as the formates, acetates and amino bases are quite suitable. It is generally desirable to employ at least about two moles of the acid acceptor for each mole of dihalotetrahydromethylfuran employed, although beneficial results are obtained employing greater or lesser amounts of the base. Most generally the mole ratio of acid acceptor to 2,3-dihalotetrahydro-2-methylfuran will be within the range of about 0.5:1 to 3:1, the preferred ratios being within the range of about 2.0:1 to 2.25:1. Of the many acid acceptors that can be employed for the present purpose, pyridine and sodium formate are most preferred. All of the acid acceptor which is to be used can be added initially to the reaction medium, or the addition may be made incrementally during the course of the reaction.

The thioformamide reactant can be used effectively in its purified crystalline form or as a crude oil such as is obtained by the reaction of formamide with phosphorus pentasulfide. A convenient way for preparing this reactant is by the reaction of phosphorus pentasulfide with formamide dissolved in tetrahydrofuran as disclosed in the application of Schmitz, Serial No. 272,693, filed February 20, 1952. The crude thioformamide obtained by distilling tetrahydrofuran from the reaction medium under reduced pressure can be employed with excellent results in carrying out the present invention. If desired, however, the crude thioformamide can be extracted with a solvent such as ether and recrystallized from a solvent such as ethyl acetate to obtain purified crystalline thioformamide for the present use.

The 2,3-dihalotetrahydro-2-methylfuran reactant can be obtained in any desired manner for the present purpose. One convenient and effective method for its preparation is by the controlled and simultaneous addition of chlorine or bromine and 4,5-dihydro-2-methylfuran to a suitable reaction medium maintained at a low temperature as set forth in the above-mentioned application of Hause. Following the reaction, the reaction solvent, e. g. methylene chloride, may be removed by distillation to leave the crude 2,3-dihalotetrahydro-2-methylfuran which can be used with excellent results in carrying out the present reaction. If desired purified material, obtained by fractional distillation of the crude material can be used for the present purpose.

The thioformamide and the 2,3-dihalotetrahydro-2-methylfuran can be reacted with excellent results employing the two materials in approximately equimolar proportions; however, a large excess of either reactant may be used if desired. Usually the mole ratio of thioformamide to the dihalo compound will be within the range 0.5:1 to 3.0:1, the preferred range being 1.75:1 to 2.0:1 since within this range the best yields of the desired thiazole compound are obtained.

When using formic acid, acetic acid, or aqueous solutions thereof as reaction media, part of the thiazole product is converted during the reaction to the formate or acetate ester of the thiazole. Thus, if concentrated formic acid is used as the reaction medium and the thiazole product is isolated by extracting the reaction medium, after making it basic, with a suitable solvent, followed by fractional distillation of the extract, a low boiling forerun is obtained at the expense of the thiazole. This low boiling material is the formate ester of the thiazole. It can be hydrolyzed to the thiazole by heating the reaction mixture with water. Thus, when the final reaction mixture is diluted with approximately 0.5 to 5 volumes of water and then heated at 90–100° C. for from 1 to about 3 hours no low boiling forerun of the type indicated is obtained and the conversion to the desired thiazole is correspondingly increased.

The thiazole product can be recovered from the reaction medium by conventional methods, e. g., by extraction with a suitable solvent after the reaction medium has been made basic, followed by fractionally distilling the extract. Solvents usable for this purpose are methylene chloride, chloroform and diethyl ether, although any other suitable solvent may be used. The thiazole obtained by the fractional distillation of the extract had the boiling point and refractive index reported for 4-methyl-5-(β-hydroxyethyl)-thiazole and gave the correct analysis for carbon, hydrogen and nitrogen. It gave picrate, p-nitrobenzoate and hydrogen chloride derivatives having melting points and carbon, hydrogen and nitrogen analyses agreeing with the values reported for these derivatives.

The invention is illustrated by the following examples.

Example 1

One hundred fifty-five milliliters (about 180 g.) of 88% formic acid (by weight), 77.5 g. (0.5 mole) of 2,3-dichlorotetrahydro-2-methylfuran, 79 g. (1.0 mole) of pyridine and 61 g. (0.1 mole) of thioformamide were placed into a 500 ml. reaction flask. The reaction mixture was stirred at 55–60° C. for 20 hours after which the major part of the formic acid was removed from the mixture by distillation under reduced pressure. Water, 250 ml., was then added to the remaining mixture and the latter was then stirred at 95–100° C. for 2 hours. The mixture was then extracted with two 100 ml. portions of methylene chloride and the combined methylene chloride extracts were washed with two 50 ml. portions of water containing 5 ml. of concentrated hydrochloric acid. The aqueous wash solutions were then added to the original aqueous residue and the mixture was made basic with sodium carbonate then extracted with five 100 ml. portions of methylene chloride. After drying the combined methylene chloride extracts from this last extraction over anhydrous sodium sulfate, methylene chloride was removed by distillation. The residue, which contained both pyridine and thiazole, was fractionally distilled under reduced pressure. The pyridine fraction was separated at 2–4 mm. while at 54 g. fraction of 4-methyl-5-(β-hydroxyethyl)-thiazole was collected at 110–116° C. (0.7 mm.), $n_D^{20}$ 1.5470. The amount of the thiazole obtained corresponded to a conversion of 76%.

*Example 2*

Example 1 was repeated except that 68 g. (1.0 mole) of sodium formate was used as the acid acceptor in place of pyridine. The conversion to thiazole was 68%.

*Example 3*

Twenty milliliters (about 16.3 g.) of 95% ethanol, 11.0 g. (0.071 mole) of 2,3-dichlorotetrahydro-2-methylfuran and 6.5 g. (0.1 mole) of thioformamide were added to a 100 ml. reaction flask. The reaction mixture was stirred under reflux (80–83° C.) for 24 hours, an additional 2.0 g. of thioformamide being added to the reaction mixture after the first 4 hours of reflux. The final reaction mixture was acidified with dilute hydrochloric acid and extracted with two portions of ether and the extract discarded. The aqueous layer was made basic with sodium carbonate then extracted with five portions of ether. The combined ether extracts from the last extraction were dried over anhydrous sodium sulfate after which the ether was removed by distillation and the dry residue was fractionally distilled to obtain 3.65 g. of 4-methyl-5-(β-hydroxyethyl)-thiazole. This amount corresponded to a conversion of 36%.

*Example 4*

Eleven grams (0.071 mole) of 2,3-dichlorotetrahydro-2-methylfuran, 11,2 g. (0.142 mole) of pyridine and 7.5 g. (0.123 mole) of thioformamide and 25 ml. (30 g.) of aqueous formic acid containing 88% by weight HCOOH were placed in a reaction vessel and the reaction allowed to proceed for 24 hours at 40° C. The reaction mixture was then diluted with water and the diluted mixture heated at 95–100° C. for 2 hours to hydrolyze the by-product formate ester of the thiazole. The thiazole product was then isolated as described in Example 1. 4.6 g., of 4-methyl-5-(β-hydroxyethyl)-thiazole was obtained, corresponding to a conversion of 46%. In an experiment carried out exactly the same way except that the final reaction mixture was not diluted with water and heated to hydrolyze the by-product formate ester, 2.5 g. of the thiazole was obtained, corresponding to a conversion of 25%. This example demonstrates the advantage of hydrolyzing the reaction mixture prior to recovering the thiazole when using a formic acid reaction medium.

The methods of the above examples can be carried out substantially as described and with generally similar results employing 2,3-dibromotetrahydro-2-methylfuran in place of 2,3-dichlorotetrahydro-2-methylfuran. For economic reasons, use of the latter compound is preferred.

It will be obvious that substantially inert solvents other than those illustrated in the examples can be used to assist in carrying out the reaction; that solvents other than those shown in the examples can be used for extracting the thiazole product from the reaction mixture; and, that other details specifically illustrated in the examples can be changed considerably without departing from the scope of the invention.

We claim:

1. The method of preparing 4-methyl-5-(β-hydroxyethyl)thiazole comprising reacting thioformamide with a dihalo compound from the group consisting of 2,3-dichlorotetrahydro-2-methylfuran and 2,3-dibromotetrahydro-2-methylfuran.

2. The method of claim 1 wherein the reaction is carried out in the presence of a solvent.

3. The method of claim 1 wherein the reaction is carried out at a temperature of 15 to 100° C.

4. The method of claim 1 wherein the reaction is carried out in the presence of an acid acceptor.

5. The method of preparing 4-methyl-5-(β-hydroxyethyl)thiazole comprising reacting thioformamide with a dihalo compound from the group consisting of 2,3-dichlorotetrahydro-2-methylfuran and 2,3-dibromotetrahydro-2-methylfuran in a solvent at a temperature of 15 to 100° C.

6. The method of claim 5 wherein the reaction is carried out in the presence of an acid acceptor.

7. The method comprising reacting thioformamide with a dihalo compound from the group consisting of 2,3-dichlorotetrahydro-2-methylfuran and 2,3-dibromotetrahydro-2-methylfuran in the presence of a solvent and recovering 4-methyl-5-(β-hydroxyethyl)-thiazole from the reaction mixture.

8. The method comprising reacting thioformamide with a dihalo compound from the group consisting of 2,3-dichlorotetrahydro-2-methylfuran and 2,3-dibromotetrahydro-2-methylfuran in the presence of a solvent, said thioformamide and said dihalo compound being supplied to the reaction mixture in amounts corresponding to a mole ratio of the former to the latter within the range 0.5:1 to 3.0:1, and recovering 4-methyl-5-(β-hydroxyethyl)-thiazole from the reaction mixture.

9. The method of claim 8 wherein the mole ratio of thioformamide to the dihalo compound is within the range 1.75 to 2.0:1.

10. The method of claim 8 wherein the reaction is carried out in the presence of from about 0.5 to about 3.0 moles of an acid acceptor per mole of the dihalo compound employed.

11. The method of claim 10 wherein from about 2.0 to 2.25 moles of an acid acceptor is employed per mole of the dihalo compound.

THOMAS E. LONDERGAN.
WILLIAM R. SCHMITZ.

References Cited in the file of this patent

UNITED STATES PATENTS

| Number | Name | Date |
|---|---|---|
| 2,356,594 | Konig et al. | Aug. 22, 1944 |

FOREIGN PATENTS

| Number | Country | Date |
|---|---|---|
| 199,783 | Switzerland | Nov. 16, 1938 |
| 663,305 | Germany | Aug. 3, 1938 |